Feb. 5, 1924.
A. F. DOOLEY
1,482,428
WINDSHIELD WIPER
Filed May 17, 1922
3 Sheets-Sheet 1
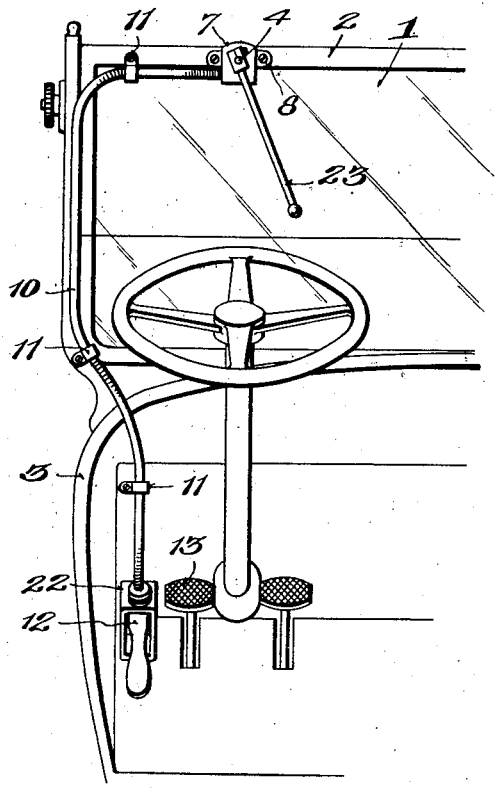
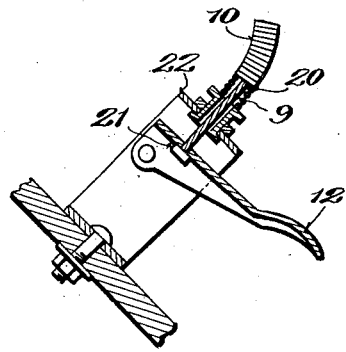
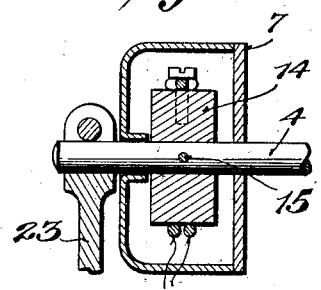
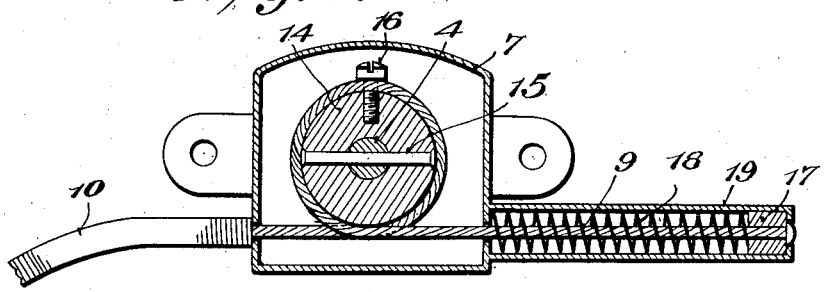

Feb. 5, 1924.  
A. F. DOOLEY  
WINDSHIELD WIPER  
Filed May 17, 1922  
1,482,428  
3 Sheets-Sheet 2
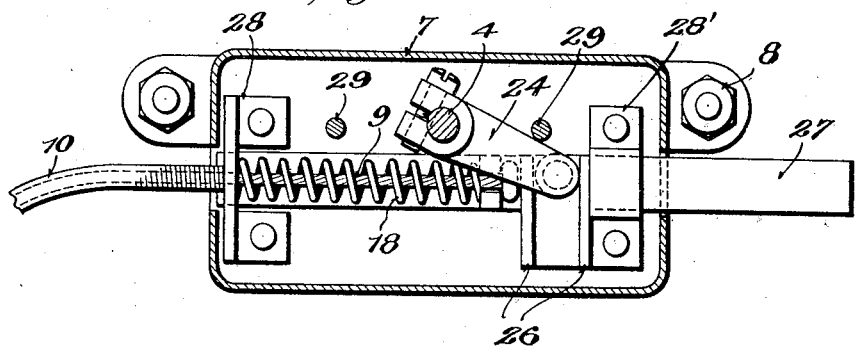
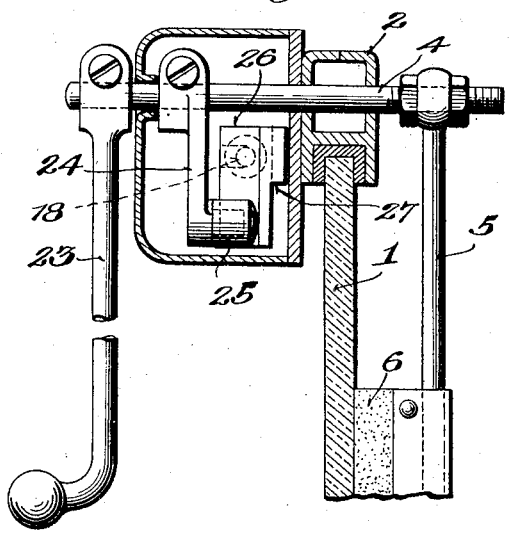
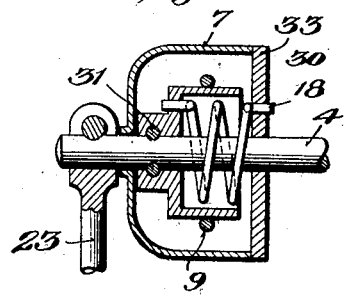
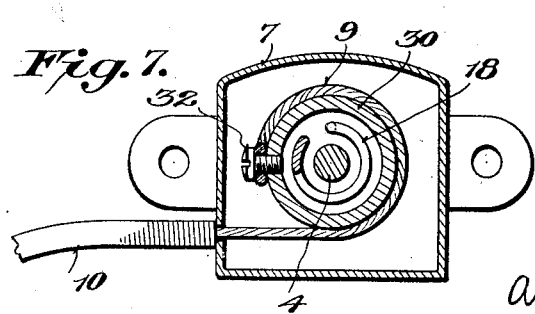
Inventor  
Arthur F. Dooley  
By Mauro, Cameron, Lewis & Kerkam  
Attorneys Feb. 5, 1924.

A. F. DOOLEY 1,482,428

WINDSHIELD WIPER

Filed May 17, 1922

Inventor
Arthur F. Dooley
By Mauro, Cameron, Lewis & Herkey
Attorneys

Patented Feb. 5, 1924.

1,482,428

UNITED STATES PATENT OFFICE.

ARTHUR F. DOOLEY, OF PHILADELPHIA, PENNSYLVANIA.

WINDSHIELD WIPER.

Application filed May 17, 1922. Serial No. 561,678.

*To all whom it may concern:*

Be it known that I, ARTHUR F. DOOLEY, a citizen of the United States of America, and a resident of Philadelphia, Pennsylvania, have invented new and useful Improvements in Windshield Wipers, which invention is fully set forth in the following specification.

This invention relates to automobile windshield wipers for cleaning the windshield of snow, rain, or other foreign matter to enable the operator to have an unobstructed view at all times.

It has heretofore been proposed to actuate windshield wipers by hand-operated, foot-operated, and automatically operated devices. Hand-operated devices are objectionable in that they cannot be manipulated except at certain times, since both hands of the operator are often employed in handling the steering wheel and gear shift lever at the very time that it becomes desirable to actuate the wiper. Moreover, the wiper occupies a position on the windshield such that the steering wheel prevents the driver from reaching it easily.

Windshield wipers of the foot-operated type heretofore proposed are objectionable in that they require the use of a cord passing down across the face of the windshield or the use of guide tubes or pulleys in order that the operating cord may be led to the actuating pedal. In any event, the cords are exposed, the use of pulleys and guide tubes is expensive and the cord cannot be made to follow the curved contours of the vehicle, since pulleys and guide tubes permit of right angle turns only.

On the other hand, the mechanically operated, automatic wipers of the type heretofore proposed are costly to manufacture and install and do not stand up under the severe operating conditions to which they are subjected.

An object of this invention is to provide a windshield wiper in which the motion-transmitting element leading from the wiper arm to the actuating means follows the curved surfaces of the vehicle to which it is secured, does not pass down across the face of the windshield, and does not occupy an exposed position where it is likely to be accidentally caught and broken.

A further object of the invention is to provide a construction whereby the necessity of guide tubes and pulleys for guiding the motion-transmitting element from the windshield to the actuating means is eliminated. This object is attained by the use of a Bowden wire, viz, a core wire around which is wound a coil of wire constituting a tubular sheath, the core wire and the tubular sheath being capable of movement with relation to each other. A wire of this type lends itself with great facility to the transmission of motion around curves and corners, the motion preferably being transmitted, in this case, by a pull. It is also extremely reliable and durable, and can be easily applied in any position.

Other objects of this invention are to provide a windshield wiper that may be readily installed on any type of car or vehicle, which, if desired, may be operated by foot or by hand, which will occupy a small space and not interfere with the driver's vision, which will operate at all times under the most severe conditions and which is economical to manufacture.

The invention will be more fully understood by reference to the accompanying drawings, illustrating several expressions of the inventive idea, and in which—

Fig. 1 is a view showing one embodiment of my invention installed on a windshield;

Fig. 2 is a detail of a pedal for actuating the device;

Figs. 3 and 4 are a front view and side view, in section, showing means for connecting the Bowden wire to the revolvable shaft;

Figs. 5 and 6 are a front and side view, respectively, in section, of another embodiment of the connection between the Bowden wire and the wiping arm;

Figs. 7 and 8 are a front and side view respectively, in section, of still another embodiment of said connection.

Figure 9:
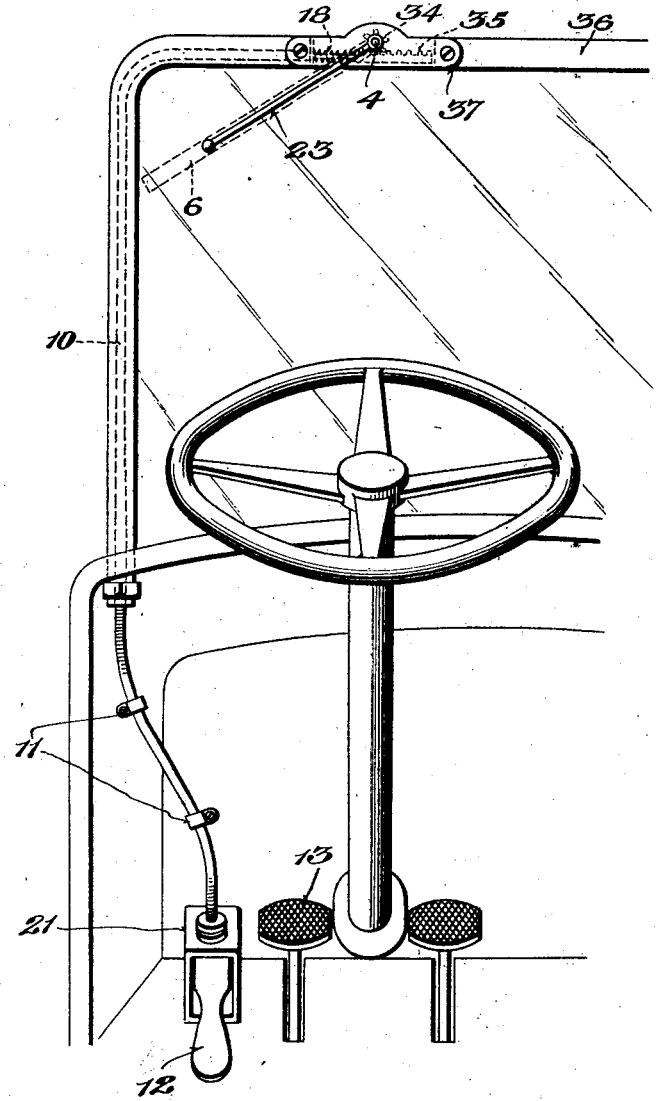
Fig. 9 is a view showing my invention installed on a windshield wherein a portion of the Bowden wire and its connection with the wiper arm are mounted within a hollow windshield frame.

Referring to the drawings, in which like reference numerals indicate like parts, and especially to Figs. 1 and 2, 1 indicates an automobile windshield mounted in any well known manner on a frame 2 secured to the body 3. Attached in any suitable way to the windshield frame, either at the top or on the side, in the operator's line of vision, is a revoluble shaft 4 carrying on its outer end a wiping arm 5, see Fig. 6, provided with a rubber wiping element 6 for cleaning the windshield of any foreign matter which tends to obstruct the driver's view. Connected in any suitable way to shaft 4, interiorly of a case 7 which may be secured to the frame 2 by means of screws 8, is the core wire 9 of a Bowden wire 10. Clamps 11 are provided for securing the Bowden wire to the frame and body in such a way that it follows the curved surfaces thereof and terminates at a foot-actuated member or pedal 12.

Any suitable type of pedal, which is preferably secured to the foot-board just to the left of the clutch pedal 13, may be provided for moving core wire 9 to actuate the wiper arm or squilgee.

Various means may be employed for operatively connecting the Bowden wire to shaft 4 in order to revolve the shaft in one direction to actuate the wiping arm.

Figs. 3 and 4 illustrate one manner in which this connection may be made wherein a drum or pulley 14 is secured to shaft 4, within case 7, by means of pin 15. Core wire 9 may be wound around pulley 14 and fixedly secured thereto at one point by means of the threaded member 16, the upper end of the core wire being firmly attached to a plunger 17 adapted to be held in one extreme position by means of a spring 18 carried in the tubular case extension 19. The other end of core wire 9 passes out through the case on the side opposite tubular extension 19, and through the tubular sheath 20 of the Bowden wire to the pedal, to which it is anchored as at 21. If desired, the upper extremity of core wire 9 may be secured directly to pulley 14, case extension 19 and spring 18 being placed on the side of case 7, through which the wire passes to the pedal. Tubular sheath 20 is fixedly secured at its upper end, in any suitable manner, to case 7, and at its lower extremity to the immovable member 22 of the pedal 12.

The operation of the device is as follows: The wiping arm being normally in a position parallel to the upper portion of frame 2, when it becomes necessary to actuate the same to clean the windshield of any foreign matter thereon, the operator forces pedal 12 downwardly, carrying with it core wire 9, and thereby pulling core wire 9 to revolve drum 14, shaft 4, and the wiper arm against the tension of spring 18. Upon release of pedal 12, the spring returns the wiper arm through an arc of approximately 180° to its original position.

If desired, a crank-arm 23 may be secured to the inner end of shaft 4, in the same plane with the wiper arm, whereby the operator may actuate the device by hand, should it be found necessary to clean the windshield at a time when the operator's feet are employed in actuating the clutch and brake pedals. Furthermore, pedal 12, or any other suitable and similar device, may be secured to body 3 in easy reach of the operator's hand, in order that core wire 9 may be actuated by hand, or by pressure of the knee, instead of by foot.

In Figs. 5 and 6, I have illustrated another manner in which the Bowden wire may be operatively connected to the wiper arm, wherein an L-shaped crank 24, carrying a roller 25, positioned to move between vertical shoulders 26 formed in a guide member 27, is secured to shaft 4 carrying the wiper arm 5. Core wire 9 is secured in any suitable manner to the plunger-like guide 27 which reciprocates in brackets 28 and 28' secured to case 7. A suitable spring 18 abuts against the guide 27 at one end and bracket 28 at the opposite end in such a manner as to oppose any movement of crank 24. Suitable stop pins 29 may be provided for limiting the arcuate movement of crank 24.

In Figs. 7 and 8, I have illustrated further means for connecting the Bowden wire to shaft 4, wherein a drum 30, fixedly secured to the shaft as at 31 and to which one end of core wire 9 is anchored as at 32, is enclosed in case 7. A spring 18 secured at one end to the drum and at its opposite end to the rear wall 33 of case 7, opposes revolution of shaft 4 by movement of pedal 12 and core wire 9, in such a manner that after the wiper arm is moved to clean the windshield, the spring returns said arm to its normal position.

It is highly desirable that the Bowden wire and its connection to the wiper arm be inconspicuous and occupy a minimum amount of space in order that it may not detract from the appearance of the windshield and that the actuating means, and more especially the motion-transmitting element, shall not occupy an exposed position where it is likely to be accidentally broken.

In Fig. 9, I have illustrated the Bowden wire passing through a hollow windshield frame and connected to the shaft 4 inside of said frame. In this embodiment, a pinion 34 secured to said shaft 4 engages a rack 35 mounted for movement back and forth within the hollow frame 36. Core wire 9 is suitably secured to rack 35 and spring 18 is positioned to oppose movement of the rack and core wire. A removable cover-plate 37 may be provided for permitting access to the rack and pinion, and shaft 4 may be extended through an opening in said cover in order to secure a hand-operating crank 23 thereto, if desired. Any one of the connections heretofore described may be used in this embodiment in place of the rack and pinion, and said rack and pinion connection may be used, when the connection is disposed exteriorly of the windshield frame. It will therefore be perceived that I have provided a windshield wiper which utilizes a Bowden wire for transmitting motion thereto, thus avoiding the use of an objectionable cable passing downward across the face of the windshield, and the use of guide tubes or pulleys with their attendant cost and unsightliness.

The inventive idea set forth herein is capable of being embodied in a variety of mechanical forms, some of which, for the purpose of illustrating the invention, are shown in the accompanying drawings, but it is to be expressly understood that such drawings are for the purpose of illustration only and are not designed to define the limits of the invention, reference being had to the appended claims for this purpose.

What is claimed is:—

1. A device of the class described comprising in combination, a shaft revolubly mounted on a windshield frame, a wiping element carried by said shaft, a pedal, a Bowden wire having its core connected at one end thereof to said pedal and having operative engagement at its opposite end with said shaft whereby the shaft may be revolved in one direction, and means connected to the shaft to revolve the same in the other direction, said Bowden wire being led from said shaft to said pedal along said windshield frame and exteriorly of the limits of the windshield glass carried by said frame.

2. In a device of the class described, a revoluble shaft mounted on a hollow windshield frame, a wiping arm carried by said shaft, and means for actuating said arm, said means comprising a Bowden wire passing through said hollow frame and connected to the shaft interiorly of said frame to revolve it in one direction, and a spring connected to the shaft to revolve it in the other direction.

3. In a device of the class described, a revoluble shaft mounted on a hollow windshield frame, a wiping arm carried by said shaft, and means for actuating said arm, said means comprising a Bowden wire passing through said hollow frame and connected to the shaft to revolve it in one direction, and a spring connected to the shaft to revolve it in the other direction, said spring being mounted within said hollow windshield frame.

4. In a device of the class described, a revoluble shaft mounted on a hollow windshield frame, a wiping arm carried by said shaft, and means for actuating said arm, said means comprising a Bowden wire passing through said hollow frame and connected to the shaft to revolve it in one direction, a spring connected to the shaft to revolve it in one direction, a spring connected to the shaft to revolve it in the other direction, and a device connected to said wire whereby an operator may actuate said wire by foot.

5. A device of the class described comprising, in combination, a wiper-carrying member rotatably mounted on a windshield frame, a rack operatively engaging said member and mounted to reciprocate substantially parallel to the upper portion of said frame, a manually operable element, a Bowden wire having its core member in operative engagement at one end thereof with said rack and at its opposite end with said element for moving said rack in one direction, and means for returning the rack and manually operable element to their normal position.

In testimony whereof I have signed this specification.

ARTHUR F. DOOLEY.